(12) United States Patent
Platel et al.

(10) Patent No.: US 8,703,846 B2
(45) Date of Patent: Apr. 22, 2014

(54) WORKABILITY OF AN AQUEOUS FORMULATION WITH A HYDRAULIC BINDER BASE USING A COMBINATION OF COMB-BRANCHED POLYMERS

(75) Inventors: David Platel, Saint Maurice de Gourdans (FR); Jean Moro, Saint Didier de Formans (FR); Olivier Guerret, La Tour de Salvagny (FR)

(73) Assignee: Coatex S.A.S., Genay (FR)

( * ) Notice: Subject to any disclaimer, the term of this patent is extended or adjusted under 35 U.S.C. 154(b) by 775 days.

(21) Appl. No.: 12/630,089

(22) Filed: Dec. 3, 2009

(65) Prior Publication Data

US 2010/0137477 A1 Jun. 3, 2010

Related U.S. Application Data

(60) Provisional application No. 61/145,144, filed on Jan. 16, 2009.

(30) Foreign Application Priority Data

Dec. 3, 2008 (FR) ...................................... 08 58215

(51) Int. Cl.
*C08K 3/00* (2006.01)

(52) U.S. Cl.
USPC ................... 524/4; 524/5; 524/522; 524/547; 526/318.3

(58) Field of Classification Search
USPC ......................... 524/5, 4, 522, 547; 526/318.3
See application file for complete search history.

(56) References Cited

U.S. PATENT DOCUMENTS

| | | | | |
|---|---|---|---|---|
| 5,393,343 A | * | 2/1995 | Darwin et al. ................ | 106/808 |
| 5,725,657 A | * | 3/1998 | Darwin et al. ................ | 106/808 |
| 5,834,576 A | * | 11/1998 | Nagano et al. ............ | 526/318.3 |
| 6,139,623 A | * | 10/2000 | Darwin et al. ................ | 106/823 |
| 6,444,747 B1 | * | 9/2002 | Chen et al. .................... | 524/807 |
| 6,569,924 B2 | * | 5/2003 | Shendy et al. .................... | 524/5 |
| 6,858,074 B2 | * | 2/2005 | Anderson et al. ............. | 106/724 |
| 7,232,875 B1 | * | 6/2007 | Liotta et al. ................ | 526/318.3 |
| 8,258,210 B2 | * | 9/2012 | Bury et al. ........................ | 524/2 |
| 2008/0190615 A1 | * | 8/2008 | Drochon ........................ | 166/295 |
| 2008/0295741 A1 | * | 12/2008 | Jeknavorian et al. ......... | 106/823 |
| 2010/0010120 A1 | * | 1/2010 | Kensicher et al. ................ | 524/5 |
| 2010/0331453 A1 | * | 12/2010 | Shalati et al. ................. | 523/400 |
| 2012/0227634 A1 | | 9/2012 | Suau et al. | |

FOREIGN PATENT DOCUMENTS

| | | |
|---|---|---|
| JP | 2006-069859 | 3/2006 |
| JP | 2007-001844 | 1/2007 |
| WO | WO 2007/047407 A2 | 4/2007 |
| WO | WO 2008/107790 | 9/2007 |
| WO | WO 2008/080906 A1 | 7/2008 |

OTHER PUBLICATIONS

Office Action issued Jan. 29, 2013, in corresponding Chinese Patent Application No. 200980148174.X.
Office Action as received in the corresponding Japanese Patent Application No. 2011-539,113 dated Sep. 30, 2013 w/English Translation.

* cited by examiner

*Primary Examiner* — Nicole M Buie-Hatcher
*Assistant Examiner* — M. Reza Asdjodi
(74) *Attorney, Agent, or Firm* — Oblon, Spivak, McClelland, Maier & Neustadt, L.L.P.

(57) ABSTRACT

The invention pertains to improving the workability of an aqueous formulation with a hydraulic binder base using a combination between at least one comb-branched copolymer having a (meth)acrylic skeleton, onto which are grafted side-chains terminated by a hydrophilic group, and at least one comb-branched copolymer having a (meth)acrylic skeleton, onto which are grafted side-chains terminated by a hydrophobic group.

9 Claims, 2 Drawing Sheets

WORKABILITY OF AN AQUEOUS FORMULATION WITH A HYDRAULIC BINDER BASE USING A COMBINATION OF COMB-BRANCHED POLYMERS

CROSS-REFERENCE TO RELATED APPLICATIONS

This application claims the benefit of U.S. provisional application No. 61/145,144 filed Jan. 16, 2009 and FR 08 58215 filed on Dec. 3, 2008, each of which is incorporated herein by reference.

FIELD OF THE INVENTION

The present invention pertains to the field of admixtures which are used in aqueous formulations with hydraulic binder bases, such as cements, concretes, or mortars, in order to improve their workability. The highest-performance among these workability agents today are comb-branched polymers, which have a skeleton of a (meth)acrylic nature onto which are grafted monomers with hydrophilic functions, of the alcoxy- or hydroxy-polyalkylene glycol type. These polymers are hereafter designated as "hydrophilic (meth)acrylic comb-branched polymers".

BACKGROUND OF THE INVENTION

Reducing the quantity of water in formulations containing hydraulic binders, though without altering their fluidity, is essential: this results in doping their mechanical properties. To do so, the person skilled in the art has for several years developed admixtures known as "water-reducing agents", also known by the expressions "fluidifying agents", "plasticizers", and "superplasticizers".

Historically, the first of them were lignosulfonates, as described in the document U.S. Pat. No. 3,772,045. Polycondensates of formaldehyde and naphtalene or melamine sulfonates were then used, as illustrated in the documents U.S. Pat. No. 3,359,225 and U.S. Pat. No. 4,258,790.

Once adsorbed onto the surface of the cement particles, these polymers, which are negatively charged, cause a phenomenon of electrostatic repulsion, which is the impetus for the cement particle dispersion mechanism; they require a dosage of about 0.4% solids content of the polymer in relation to the solids content of the cement, as instructed in the document "Superplasticizers for extending workability" (International Conference on superplasticizers and other chemical admixtures in concrete, Sorrento Italy, Oct. 29-Nov. 1, 2006, supplementary paper, Ed. Malhotra, American Concrete Institute, pp. 263-277)

A new better-performing family of water-reducing agents then appeared: that of carboxylic comb-branched polymers with a skeleton that is generally (meth)acrylic in nature, onto which are grafted side-chains terminated by hydrophilic groups (see the document cited above).

This improved water-reducing power is explained by the existence of a steric repulsion mechanism relating to the presence of the side-chains, in combination with the electrostatic repulsion phenomenon caused by the anionic carboxylic groups. This improvement leads to the ability to use a lower quantity of the polymer (on the order of 0.2% solids content in relation to the cement's solids content) for a consistency comparable to that obtained with the first-generation products.

However, in dosages like the ones described above, none of these products of the prior art make it possible to resolve a critical technical problem for the person skilled in the art: that of workability retention over very long periods, particularly longer than 3 hours.

Workability is defined in document U.S. Pat. No. 7,232,875 as the time during which an aqueous formulation with a hydraulic binder base may still be worked. This value is conventionally measured using a slump test: the height is determined at which a sample added to a conical mold slumps when that mold is lifted. The greater the slump, the better the formulation's workability; if this nature is maintained over time, this is called slump retention.

The person skilled in the art seeks to improve the lasting nature of this workability. Indeed, it is common to manufacture a cement or concrete in a factory, in order to transport it later to the worksite where it is to be used; during this trip, which may take several hours, the formulation's workability must not be altered; otherwise, it can no longer be worked. Alternatively, a new addition of water-reducing agent must be available at the implementation site (this operation is impossible if the formulation has begun to set), or a series of injections must be available during transport. The logistics and additional cost that result are major drawbacks to using such solutions.

In order to maintain the workability of these formulations, the person skilled in the art has instinctively sought to "overdose" the quantity of water-reducing agents used, and particularly hydrophilic comb-branched (meth)acrylic polymer water-reducing agents. This overdosing is meant to extend the acting time of that agent. However, as is now well-known in this field of activity, this overdosing leads to an initial fluidification which is too high.

Consequently, the fluidifying effect acts against the dispersion mechanism: the distribution of the components is no longer even throughout the formulation, which negatively impacts its mechanical properties. In some cases, the initial fluidifying power is so noteworthy that it leads to segregation, i.e. a physical separation of the medium's various components. This issue is recounted in the document WO 2007/047407.

Given the impossibility of overdosing the water-reducing agents of the prior art, and particularly hydrophilic comb-branched (meth)acrylic polymers, the person skilled in the art has engineered alternative solutions, so as to obtain a satisfactory initial fluidifying power and stable workability over time, without the undesirable effects of segregation or loss of mechanical properties.

Thus, the document WO 2007/047407 suggests the obvious solution of adding a setting retarder agent, which raises problems of its own: the agent in and of itself constitutes a new admixture to add to the formulation, its dosage must be optimized based on the quantity of water-reducing agent used, and the resulting workability is no longer stable past two hours.

Other solutions consist of changes dealing with the composition of the hydrophilic comb-branched (meth)acrylic polymers of the prior art; however, they have the drawback of being focused on highly selective chemical structures, and none of them lead to workability lasting longer than three hours. Furthermore, they are all based on structural changes, intended to extend the fluidifying effect of the polymer that is used over time. To that end, the document "Superplasticizers for extending workability" mentioned above, discloses the grafting of side-chains of varying lengths onto the main (meth)acrylic skeleton: they gradually hydrolyze depending on their length, which maintains the dispersing effect over time (up to two and a half hours according to FIG. 4).

At the same time, the document "Development of new superplasticizer providing ultimate workability" (8th CANMET, Superplasticizers and other chemical admixtures in concrete, 2008, Ed. Malhotra, American Concrete Institute, pp. 31-49) suggests increasing the number of hydrophilic branches of a comb-branched (meth)acrylic polymer by adding a difunctional carboxylic comonomer onto the main skeleton: this results in a better adsorption of the polymer onto the surface of the cement particles, and therefore stable workability for at least one and a half hours according to table 5. Finally, the document "development of slump-loss controlling agent with minimal setting retardation" (7th CANMET, Superplasticizers and other chemical admixtures in concrete, 2003, Ed. Malhotra, American Concrete Institute, pp. 127-141) describes a comb-branched polymer whose hydrophilic side monomers have ester functions which hydrolyze more slowly: this results in good workability for two and a half hours.

SUMMARY OF THE INVENTION

Until now the potential of such comb-branched polymers could not be optimally exploited: the desire to overdose these admixtures has caused the formulation's mechanical properties to drop, and segregation, i.e. a physical separation between the various components of the mixture, has sometimes been observed.

The present invention, which relies on combining these methacrylic comb-branched polymers having a grafted monomer with a hydrophilic function, with another methacrylic comb polymer, but one which has a grafted monomer with a hydrophobic function, makes it possible to advantageously remedy this drawback. As a result, the workability of an aqueous formulation with a hydraulic binder base is maintained over periods longer than three hours, without any segregation phenomenon nor loss of mechanical properties.

Continuing her research into providing an admixture that would make it possible to maintain a good level of initial fluidity in aqueous formulations with a hydraulic binder base, while maintaining their workability without altering their mechanical properties or causing segregation phenomena to occur, the Applicant has developed the use of new admixtures resulting from the combination of at least one hydrophilic comb-branched (meth)acrylic copolymer in accordance with the prior art and at least one hydrophobic comb-branched (meth)acrylic copolymer. This last expression denotes copolymers with a comb-branched structure, having a (meth) acrylic skeleton, onto which is grafted at least one monomer having a hydrophobic function.

DETAILED DESCRIPTION OF THE INVENTION

Figure 1:
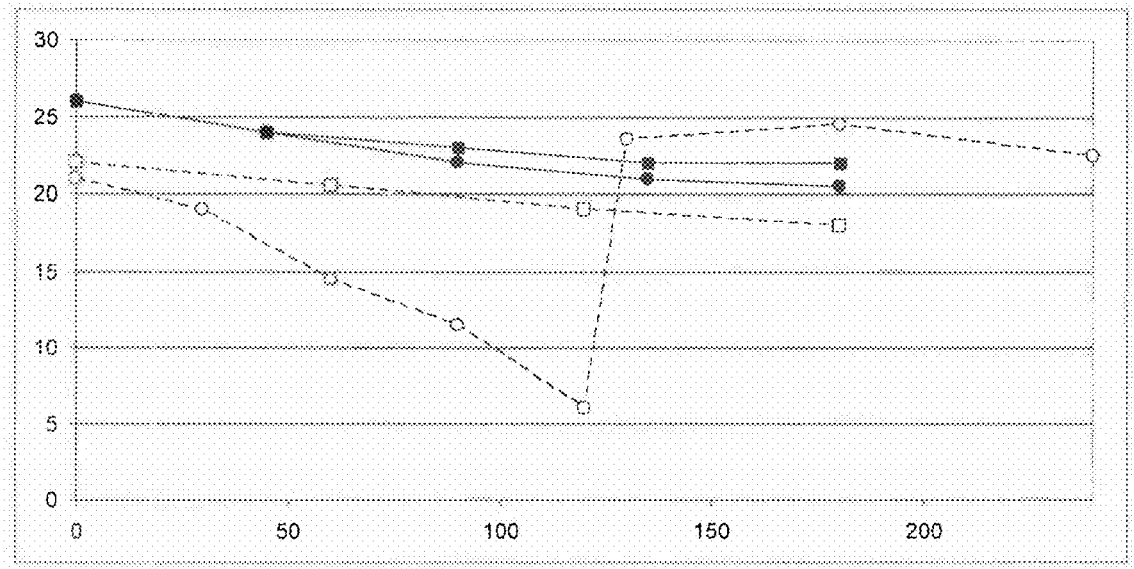
FIG. 1 shows the slump of values in centimeters of slump over time in minutes. The dotted curve with round symbols relates to Test 1 in accordance with the prior art, the dotted curve with square symbols relates to Test 2 according to the prior art, the solid curve with round symbols relates to Test 3 according to the invention, and the solid curve with square symbols relates to Test 4 according to the invention, which uses two products added as a mixture.

Entirely unexpectedly, when these hydrophobic comb-branched (meth)acrylic copolymers are used in the presence of hydrophilic comb-branched (meth)acrylic copolymer in an aqueous formulation with a hydraulic binder base, the result is a very large increase in the dose of the hydrophilic comb-branched copolymer in relation to the prior art, without segregating or altering the mechanical properties: quantities greater than 0.6% solids content of hydrophilic comb-branched polymer in relation to the weight of the cement are achieved. Doing so causes the formulation's workable time to be increased in a manner unlike any to date: values greater than three hours are achieved, as measured using a conventional slump test.

Furthermore, according to one preferred embodiment of the invention, the two comb-branched polymers may be coformulated first in the form of a single product, by mixing, which has the advantage for the person skilled in the art of having only one product.

Therefore, a first object of the invention consists of the use, as an agent improving the workability of an aqueous formula with a hydraulic binder base, of:
  a) at least one comb-branched (meth)acrylic copolymer having at least one side-chain bearing at least one alcoxy- or hydroxy-polyalkylene glycol hydrophilic group,
  b) at least one comb-branched (meth)acrylic copolymer having at least one side-chain bearing at least one hydrophobic group.

In a first variant, this use as an agent improving the workability of an aqueous formula with a hydraulic binder base is further characterized in that said comb-branched copolymer a) and said comb-branched copolymer b) are added to said aqueous formulation separately.

In a second variant, this use as an agent improving the workability of an aqueous formulation with a hydraulic binder base is further characterized in that said comb-branched copolymer a) and said comb-branched copolymer b) are added in the form of a mixture.

According to this variant, the mixture has a solids content between 10% and 50% of its total weight.

According to this variant, the mixture has a dry solids content of comb-branched copolymer a) of between 5% and 95%, and preferentially between 10% and 90% of its total solid matter.

This use is further characterized in that said comb-branched copolymer a) is made up of, expressed as a percentage by weight of each of its monomers, the sum of these percentages being equal to 100%:
  a1) 5% to 30% of (meth)acrylic acid,
  a2) 70% to 95% of at least one monomer having the formula (I):

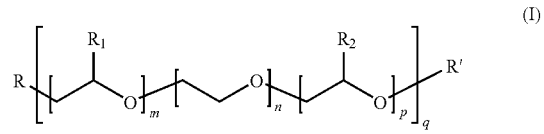

where:
  m, n, p and q are whole numbers and m, n, p are less than 150, q is greater than 0, and at least one whole numbers among m, n and p is nonzero;
  R is a radical that includes a polymerizable unsaturated function;
  $R_1$ and $R_2$ are identical or different, and represent hydrogen atoms or alkyl groups, R' represents hydrogen or a hydrocarbon radical having 1 to 3, or an ionic or ionizable group such as a phosphate, a phosphonate, a sulfate, a sulfonate, a carboxylic, or a primary, secondary, or tertiary amine, or an quaternary ammonium, or mixtures thereof, a3) 0% to 50% of at least one monomer different from monomers a1) and a2), and which is preferentially an ester, an amide, an ether, a styrenic monomer, a cationic monomer, a sulfonated monomer, a phosphated monomer, and which is very preferentially ethyl acrylate.

This use is further characterized in that said comb-branched copolymer b) is made up of, expressed as a percentage by weight of each of its monomers, the sum of these percentages being equal to 100%:

b1) 30% to 95% of (meth)acrylic acid,
b2) 5% to 70% of at least one monomer having the formula (I):

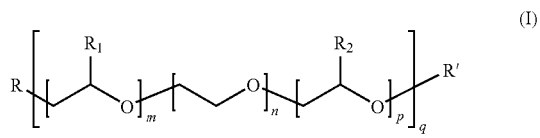

where:
m, n, p and q are whole numbers and m, n, p are less than 150, q is greater than 0, and at least one whole numbers among m, n and p is nonzero;
R is a radical that includes a polymerizable unsaturated function;
$R_1$ and $R_2$ are identical or different, and represent hydrogen atoms or alkyl groups,
R' represents a hydrocarbon radical having 8 to 36 carbon atoms,
b3) 0% to 50% of at least one monomer different from monomers a1) and a2), and which is preferentially an ester, an amide, an ether, a styrenic monomer, a cationic monomer, a sulfonated monomer, a phosphated monomer, and which is very preferentially ethyl acrylate.

This use is further characterized in that said comb-branched copolymer a) and comb-branched polymer b) may be obtained by radical polymerization in a solution, direct emulsion, or inverse emulsion, in a suspension or precipitation in solvents, in the presence of catalytic systems and transfer agents, or by radical mediated polymerization and preferentially by nitroxide mediated polymerization (NMP) or cobaloxyme mediated polymerization, by atom transfer radical polymerization (ATRP), or by radical mediated polymerization by sulfur derivatives, chosen from among carbamates, dithioesters or trithiocarbonates (RAFT) or xanthates.

In one particular variant, this use is characterized in that comb-branched copolymer a) and comb-branched polymer b) are obtained by copolymerizing in the presence of (meth)acrylic acid and potentially in the presence of a monomer as defined in points a3) and b3), at least one type a2) monomer, and at least one type b2) monomer. This being done, it is understood that the result is both a particular comb-branched copolymer onto which side-chains of types a2) and b2) are grafted, as well as products corresponding to comb-branched copolymers a) and b).

This use is further characterized in that comb-branched copolymer a) and comb-branched copolymer b) are distilled, after polymerization.

This use is further characterized in that comb-branched copolymer a) and comb-branched copolymer b) are separated into several phases, using static or dynamic separation processes, by one or more polar solvents preferentially belonging to the group formed by water, methanol, ethanol, propanol, isopropanol, butanols, acetone, tetrahydrofurane, and mixtures thereof.

This use is further characterized in that comb-branched copolymer a) and comb-branched copolymer b) are fully or partially neutralized by one or more neutralization agents having a monovalent or polyvalent cation, said agents preferentially being chosen from among ammonium hydroxide or from among calcium or magnesium hydroxides and/or oxides, or from among sodium, potassium, or lithium hydroxides, or from among primary, secondary, and tertiary aliphatic and/or cyclic amines and preferentially stearylamine, ethanolamines (mono-, di-, triethanolamine), mono- and diethylamine, cyclohexylamine, methylcyclohexylamine, aminomethyl-propanol, morpholine, and preferentially in that the neutralization agent is chosen from among triethanolamine and sodium hydroxide.

This use as an agent improving the workability of an aqueous formulation with a hydraulic binder base is further characterized in that said formulation is a cement, a mortar, a concrete, or a grout, and preferentially a concrete.

This use as an agent improving the workability of an aqueous formulation with a hydraulic binder base of:
a) at least one comb-branched (meth)acrylic copolymer having at least one side-chain bearing at least one alcoxy- or hydroxy-polyalkylene glycol hydrophilic group,
b) at least one comb-branched (meth)acrylic copolymer having at least one side-chain bearing at least one hydrophobic group.
is further characterized in that said aqueous formulation with a hydraulic binder base contains 0.1% 2%, preferentially 0.2% to 1%, and very preferentially 0.4% to 0.8% solids content of components a) and b) in relation to the solid content of hydraulic binder.

A further object of the invention consists of an aqueous formulation with a hydraulic binder base, containing:
a) at least one comb-branched (meth)acrylic copolymer having at least one side-chain bearing at least one alcoxy- or hydroxy-polyalkylene glycol hydrophilic group,
b) at least one comb-branched (meth)acrylic copolymer having at least one side-chain bearing at least hydrophobic group.

This formulation is further characterized in that said comb-branched copolymer a) is made up of, expressed as a percentage by weight of each of its monomers, the sum of these percentages being equal to 100%:
a1) 5% to 30% of (meth)acrylic acid,
a2) 70% to 95% of at least one monomer having the formula (I):

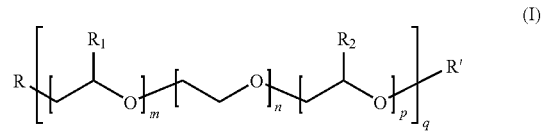

where:
m, n, p and q are whole numbers and m, n, p are less than 150, q is greater than 0, and at least one whole numbers among m, n and p is nonzero;
R is a radical that includes a polymerizable unsaturated function;

R₁ and R₂ are identical or different, and represent hydrogen atoms or alkyl groups, R' represents hydrogen or a hydrocarbon radical having 1 to 3, or an ionic or ionizable group such as a phosphate, a phosphonate, a sulfate, a sulfonate, a carboxylic, or a primary, secondary, or tertiary amine, or an quaternary ammonium, or mixtures thereof, a3) 0% to 50% of at least one monomer different from monomers a1) and a2), and which is preferentially an ester, an amide, an ether, a styrenic monomer, a cationic monomer, a sulfonated monomer, a phosphated monomer, and which is very preferentially ethyl acrylate.

This formulation is further characterized in that said comb-branched copolymer b) is made up of, expressed as a percentage by weight of each of its monomers, the sum of these percentages being equal to 100%:

b1) 30% to 95% of (meth)acrylic acid, b2) 5% to 70% of at least one monomer having the formula (I):

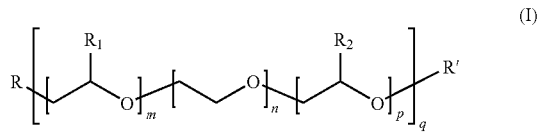

where:
m, n, p and q are whole numbers and m, n, p are less than 150, q is greater than 0, and at least one whole numbers among m, n and p is nonzero;

R is a radical that includes a polymerizable unsaturated function;

R₁ and R₂ are identical or different, and represent hydrogen atoms or alkyl groups, R' represents a hydrocarbon radical having 8 to 36 carbon atoms, b3) 0% to 50% of at least one monomer different from monomers a1) and a2), and which is preferentially an ester, an amide, an ether, a styrenic monomer, a cationic monomer, a sulfonated monomer, a phosphated monomer, and which is very preferentially ethyl acrylate.

This formulation is further characterized in that comb-branched copolymer a) and comb-branched polymer b) may be obtained by radical polymerization in a solution, direct emulsion, or inverse emulsion, in a suspension or precipitation in solvents, in the presence of catalytic systems and transfer agents, or by radical mediated polymerization and preferentially by nitroxide mediated polymerization (NMP) or by cobaloxyme mediated polymerization, by atom transfer radical polymerization (ATRP), by radical mediated polymerization by sulfur derivatives, chosen from among carbamates, dithioesters or trithiocarbonates (RAFT) or xanthates.

In one particular variant, this use is characterized in that comb-branched copolymer a) and comb-branched polymer b) are obtained by copolymerizing in the presence of (meth) acrylic acid and potentially in the presence of a monomer as defined in points a3) and b3), at least one type a2) monomer, and at least one type b2) monomer. This being done, it is understood that the result is both a particular comb-branched copolymer onto which side-chains of types a2) and b2) are grafted, as well as products corresponding to comb-branched copolymers a) and b).

This formulation is further characterized in that comb-branched copolymer a) and comb-branched copolymer b) are distilled, after polymerization.

This formulation is further characterized in that comb-branched copolymer a) and comb-branched copolymer b) are separated into several phases, using static or dynamic separation processes, by one or more polar solvents preferentially belonging to the group formed by water, methanol, ethanol, propanol, isopropanol, butanols, acetone, tetrahydrofurane, and mixtures thereof.

This formulation is further characterized in that comb-branched copolymer a) and comb-branched copolymer b) are fully or partially neutralized by one or more neutralization agents having a monovalent or polyvalent cation, said agents being preferentially chosen from among ammonium hydroxide or from among calcium or magnesium hydroxides and/or oxides, or from among sodium, potassium, or lithium hydroxides, or from among primary, secondary, and tertiary aliphatic and/or cyclic amines and preferentially stearylamine, ethanolamines (mono-, di-, triethanolamine), mono- and diethylamine, cyclohexylamine, methylcyclohexylamine, aminomethyl-propanol, morpholine, and preferentially in that the neutralization agent is chosen from among triethanolamine and sodium hydroxide.

This formulation is further characterized in that it is a cement, a mortar, a concrete, or a grout, and preferentially a concrete.

This formulation is further characterized in that it contains 0.1% to 2%, preferentially 0.2% to 1%, and very preferentially 0.4% to 0.8% solids content of components a) and b) in relation to the solid content of hydraulic binder.

The examples that follow will make it possible to better illustrate the present Application, though without limiting its scope.

EXAMPLES

The polymers used are obtained by polymerization techniques which are well-known to the person skilled in the art.

All of the tests begin by adding into a masonry-style electric cement mixer (volume of about 100 liters) 22 kg of 10/20 aggregates and 25 kg of 0/4 sand, which are then mixed for 30 seconds.

Next, 6.5 kg of CEM I 52.4 PM ES cement are added; this corresponds to the starting time.

The dry materials are mixed for 1 minute.

Next, a certain quantity of an aqueous solution containing the product according to the prior art or according to the invention is added.

The mixing of the blend is then continued for 7 minutes.

The slump is then measured with an Abrams cone using the method described in the AFNOR EN 12350-2 standard. This first measurement corresponds to the initial slump value, whose change is tracked over time.

The slump of values has been depicted in FIG. 1, in centimeters of slump over time in minutes.

The dotted curve with round symbols relates to Test 1 in accordance with the prior art, in which it is necessary to add product to compensate for the loss of workability (relative to the slump measurement).

The dotted curve with square symbols relates to Test 2 according to the prior art, in which the product is overdosed.

The solid curve with round symbols relates to Test 3 according to the invention, which uses two products added separately.

The solid curve with square symbols relates to Test 4 according to the invention, which uses two products added as a mixture.

Test No. 1

This test illustrates the prior art and uses 0.065 kg of an aqueous solution (40% by weight) of a hydrophilic comb-branched copolymer made up of (by weight):
- a1) 10% methacrylic acid,
- a2) 90% of a monomer with formula (I) wherein:
  - m+n+p=56, q=1
  - R is the methacrylate function,
  - $R_1$ and $R_2$ designate the methyl group,
  - R' designates hydrogen In this test, the product is (hydrophilic comb-branched polymer) used is therefore 0.40% solids content of the copolymer in relation to the cement's solids content, which corresponds to the dose normally used by the person skilled in the art.

Tracking the change in slump over time (see the dashed curve with round symbols in FIG. 1), a reduction in slump is observed, meaning a very noteworthy loss of workability.

At the end of 2 hours, it was sought to remedy this decrease by adding 0.035 kg of the same aqueous solution containing the same copolymer: its dose then became equal to 0.62% solids content of copolymer in relation to the cement's solids content.

Workability is then observed to rise again. However, it was necessary to add the product: this represents both logistics which are complicated to develop at an industrial scale, and an intermediate (and therefore undesirable) change to the composition of the concrete.

Test No. 2

This test illustrates the prior art and uses 0.1 kg of the same aqueous solution as the one used during Test 1.

In this situation, all of said solution is added at the beginning of the test. The dose of the product (a hydrophilic comb-branched polymer) that is used is equal to 0.62% by solids content in relation to the solids content of the cement: this illustrates an "overdosage" test as sometimes practiced in the prior art.

First, it is noted that workability is less than that obtained with the inventive products (see FIG. 1).

Figure 2:
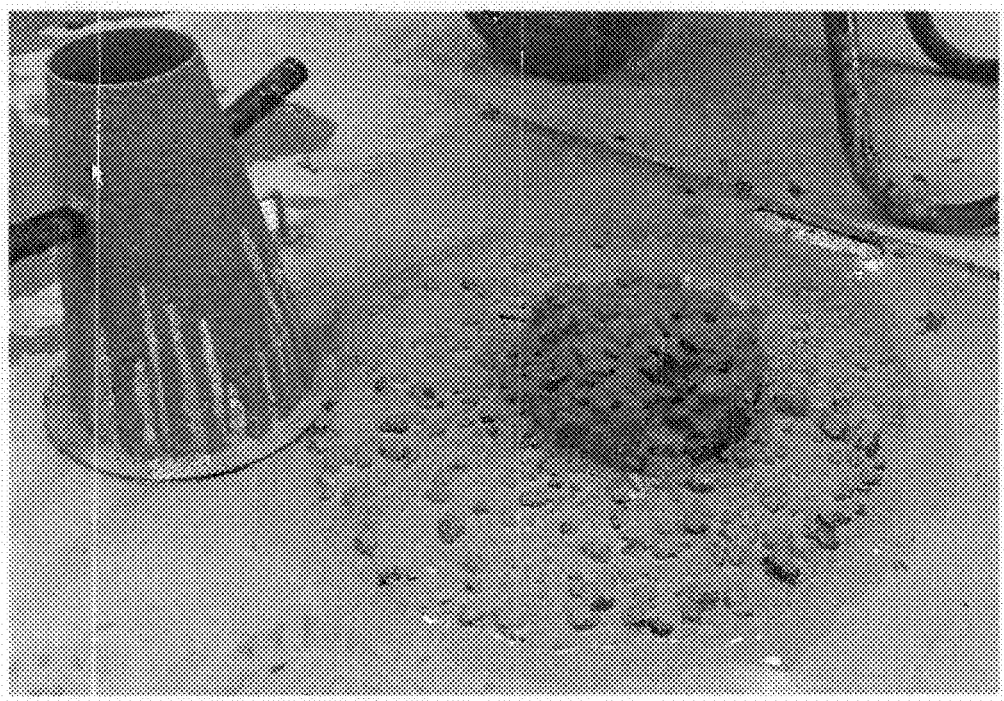
FIG. 2 is a photo representing the composition in Test 2 at the initial moment, once the Abrams cone has been removed.

Second, as shown in FIG. 2, which is a photo representing the composition at the initial moment, once the Abrams cone has been removed, a very noteworthy segregation phenomenon appears, which is undesirable for the person skilled in the art.

Test No. 3

This test illustrates the invention and uses is 0.120 kg in total, including:
- a) 90% by weight of the same aqueous solution as the one used in test 1,
- b) 10% by weight of an aqueous solution of a copolymer made above, by weight:
  - b1) 40% methacrylic acid,
  - b2) 50% of a monomer with formula (I) wherein:
    - m+n+p=22, q=1
    - R is the methacrylate function,
    - $R_1$ and $R_2$ designate hydrogen,
    - R' designates the linear alkyl chain having 22 carbon atoms
  - b3) 10% ethyl acrylate.

these two solutions a) and b) being added initially, but separately.

In this test, 0.66% by solids content of hydrophilic comb-branched copolymer a) in relation to the cement's solids content is therefore used.

Test No. 4

This test illustrates the invention and uses 0.120 kg of an aqueous solution, containing:
- a) 90% by weight of aqueous solution a) used in test 1,
- b) 10% by weight of aqueous solution b) used in test 3.

The aqueous solution is initially added in the form of the mixture between solutions a) and b).

In this test, 0.66% by solids content of hydrophilic comb-branched copolymer a) in relation to the cement's solids content is therefore used.

Tests 3 and 4 do not lead to any segregation phenomenon: however, they make it possible to overdose the quantity of hydrophilic comb-branched copolymer a) that is used.

Additionally, and entirely advantageously, the result is a workability that is at all points greater than that obtained for the prior art, without adding product later on.

Finally, this workability is entirely stable for 3 hours, which was never possible before.

The invention claimed is:

1. An aqueous formulation, comprising a hydraulic binder base and
   a) at least one comb-branched (meth)acrylic copolymer having at least one side-chain bearing at least one alkoxy- or hydroxy-polyalkylene glycol hydrophilic group,
   b) at least one comb-branched (meth)acrylic copolymer having at least one side-chain bearing at least one alkoxy- or hydroxy-polyalkylene glycol hydrophobic group, wherein said comb-branched copolymer a) comprises, expressed as a percentage by weight of each of its monomers, the sum of those percentages being equal to 100%:
   a1) 5% to 30% of (meth)acrylic acid,
   a2) 70% to 95% of at least one monomer having the formula (I):

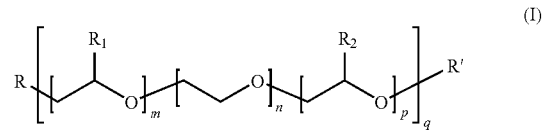

where:
   m, n, p and q are whole numbers and m, n, p are less than 150, q is greater than 0, and at least one whole number of m, n and p is not 0;
   R is a radical that includes a polymerizable unsaturated function;
   $R_1$ and $R_2$ are identical or different, and represent hydrogen or alkyl,
   R' represents hydrogen or a hydrocarbon radical having 1 to 3, or an ionic or ionizable group,
   and
   a3) 0% to 50% of at least one monomer different from monomers a1) and a2), and which is selected from the group consisting of an ester, an amide, an ether, a styrenic monomer, a cationic monomer, a sulfonated monomer, and a phosphated monomer.

2. The formulation according to 1, wherein R' represents an ionic or ionizable group selected from the group consisting of a phosphate, a phosphonate, a sulfate, a sulfonate, a carboxylic, a primary amine, a secondary amine, a tertiary amine, a quaternary ammonium, and a mixture thereof.

3. The formulation according to claim 1, wherein said comb-branched copolymer a) comprises a3), and wherein a3) is ethyl acrylate.

4. The formulation according to claim 1, wherein said comb-branched copolymer b) comprises, expressed as a percentage by weight of each of its monomers, the sum of those percentages being equal to 100%:

b1) 30% to 95% of (meth)acrylic acid,

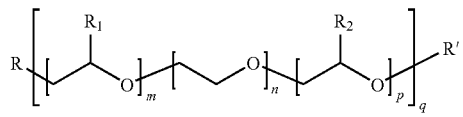

b2) 5% to 70% of at least one monomer having the formula (I):

(I)

where:
- m, n, p and q are whole numbers and m, n, p are less than 150, q is greater than 0, and at least one whole number of m, n and p is not 0;
- R is a radical that includes a polymerizable unsaturated function;
- $R_1$ and $R_2$ are identical or different, and represent hydrogen or alkyl,
- R' represents a hydrocarbon radical having 8 to 36 carbon atoms, b3) 0% to 50% of at least one monomer different from monomers a1) and a2), and which is selected from the group consisting of an ester, an amide, an ether, a styrenic monomer, a cationic monomer, a sulfonated monomer, and a phosphated monomer.

5. The formulation according to claim 4, wherein said comb-branched copolymer b) comprises b3), and wherein b3) is ethyl acrylate.

6. The formulation according to claim 1, wherein said formulation is a cement, a mortar, a concrete, or a grout.

7. The formulation according to claim 1, wherein said formulation is a concrete.

8. The formulation according to claim 1, comprising 0.1% to 2% solids content of components a) and b) in relation to the solid content of the hydraulic binder.

9. A method of improving the workability of an aqueous formulation, the method comprising adding the formulation of claim 1 to the aqueous formulation.

* * * * *